United States Patent [19]

De Weerd

[11] Patent Number: 5,759,095
[45] Date of Patent: Jun. 2, 1998

[54] APPARATUS FOR DIVIDING INTO SEPARATE PARTS AN ASSEMBLY COMPRISING HEART AND LUNGS

[75] Inventor: Hans De Weerd, Oostzaan, Netherlands

[73] Assignee: Machinefabriek Meyn B.V., Oostzaan, Netherlands

[21] Appl. No.: 679,050

[22] Filed: Jul. 12, 1996

[30] Foreign Application Priority Data

Jul. 14, 1995 [NL] Netherlands ............... 1000798

[51] Int. Cl.$^6$ ................................ A22C 21/00
[52] U.S. Cl. .................... 452/106; 452/111
[58] Field of Search .................. 452/106, 111, 452/112, 113

[56] References Cited

U.S. PATENT DOCUMENTS

| | | | |
|---|---|---|---|
| 3,480,991 | 12/1969 | Edwards, Sr. | 452/111 |
| 4,073,040 | 2/1978 | Hill | 452/111 |
| 4,395,795 | 8/1983 | Hazenbroek | 452/112 |
| 4,524,489 | 6/1985 | Van Mil | 452/112 |
| 4,524,491 | 6/1985 | Hill et al. | 452/112 |
| 4,590,643 | 5/1986 | Hill | 452/111 |

FOREIGN PATENT DOCUMENTS

| | | |
|---|---|---|
| 0141432 A1 | 5/1985 | European Pat. Off. |
| 0587253 A2 | 3/1994 | European Pat. Off. |
| 7305321 | 10/1974 | Netherlands . |
| 7613251 | 5/1978 | Netherlands . |
| 8502785 | 5/1986 | Netherlands . |
| 2120925 | 12/1983 | United Kingdom . |

OTHER PUBLICATIONS

The Netherlands Search Report, Jul. 14, 1995.

*Primary Examiner*—Willis Little
*Attorney, Agent, or Firm*—Dority & Manning

[57] ABSTRACT

The invention relates to an apparatus for dividing into separate parts an assembly removed from an entrails package of a slaughtered bird comprising heart and lungs. The apparatus comprises two rotating axes defining a slit therebetween. A first part of the axes is provided with a coarse profile, whereas a successive second part is provided with a fine profile shaped as interengaging teeth. Further, it is possible that the second part is followed by a third part which again is provided with a more coarse profile.

8 Claims, 1 Drawing Sheet

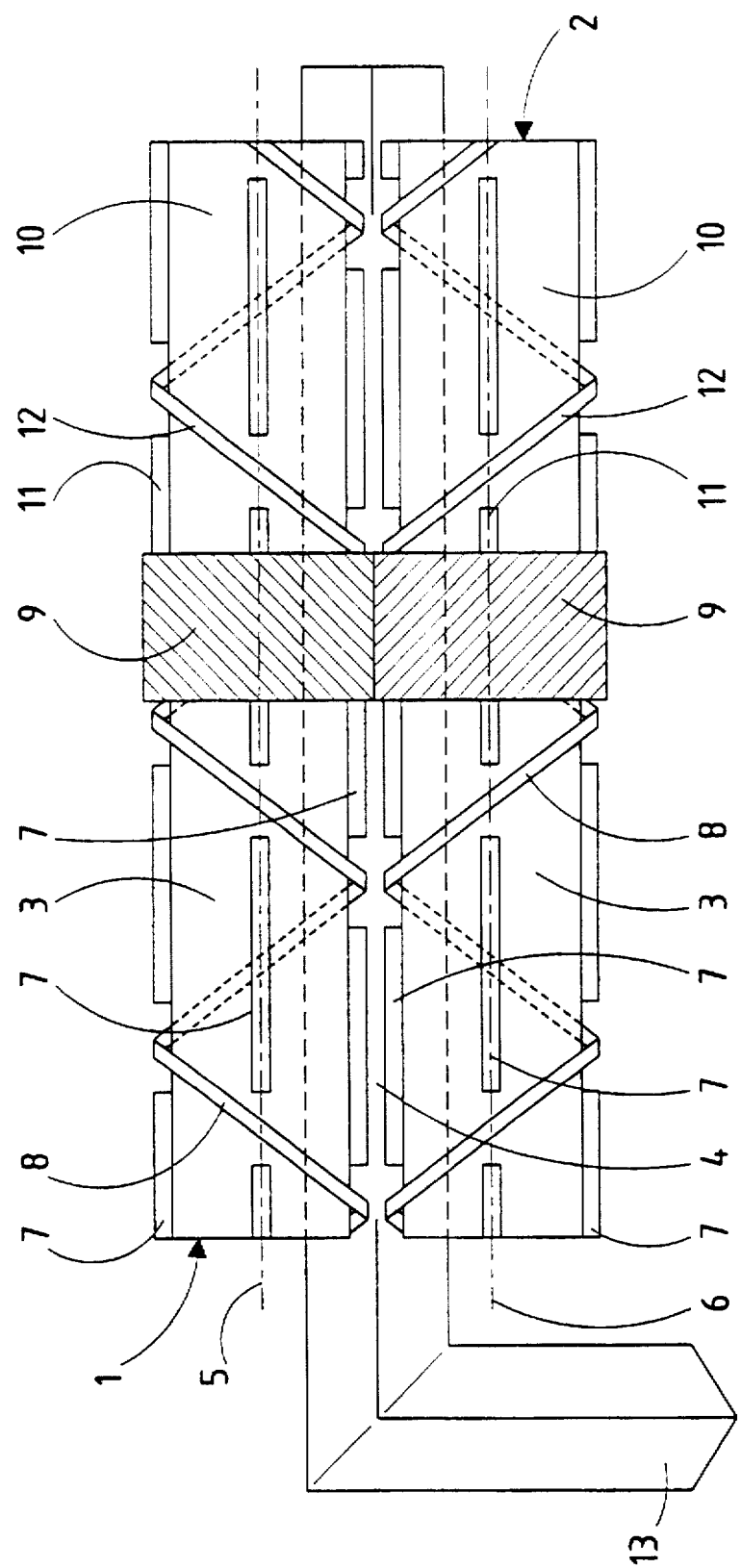

APPARATUS FOR DIVIDING INTO SEPARATE PARTS AN ASSEMBLY COMPRISING HEART AND LUNGS

BACKGROUND OF THE INVENTION

The invention relates to an apparatus for dividing into separate parts an assembly removed from an entrails package of a slaughtered bird comprising heart and lungs.

After the entrails package has been removed from the inside of a slaughtered bird, it has to be divided into parts, because these parts have separate destinations. Thus, the assembly comprising heart and lungs will be removed from the entrails package together. Next, it is necessary that the heart and the lungs are separated from each other, because the heart has a destination different from the lungs which are considered as offal.

OBJECTS AND SUMMARY OF THE INVENTION

It is an object of the invention to provide an apparatus for dividing into separate parts an assembly removed from an entrails package comprising heart and lungs in a uniform and reproducible way, also at the high production rates applied at modern slaughtering lines. Additional objects and advantages of the invention will be set forth in the following description, or may be obvious from the invention, or may be learned through practice of the invention.

Thus, the apparatus according to the invention is characterized by two rotating axes extending substantially horizontally and mutually in parallel which therebetween define a slit, said axes being provided with surface profiles for pulling down the lungs into the slit between the axes while simultaneously in a lying position moving forward the heart, wherein a first part of the axes has a coarse profile and a successive second part is provided with a fine profile shaped as interengaging teeth.

By means of two surface profiles at the first part of the axes the lungs, which are rather soft, are pulled down through the slit between the rotating axes. The hearts, which are rather firm, stay resting on top of the axis and cannot pass downwardly through the slit. Thus, the lungs will be torn free from the hearts and will be discharged at the lower side of the axes.

The second part has a third profile comprising said fine profile shaped as interengaging teeth follows the first part of the axes and, after the lungs have already been removed, fully "peels" the hearts, that means removing the tissues surrounding the heart. This fine profile in a way acts as a milling cutter, as the result of which the hearts are substantially clean after leaving said second part.

In correspondence with a preferring embodiment of the apparatus according to the invention, the profile of the first part of the axes comprises a first profile section with ribs extending in parallel with the center line of the axes and a second profile section with ribs extending helically, wherein the ribs of the different axes do not engage each other. The ribs extending in parallel with the center line of the axes are mainly responsible for pulling down the lungs through the slit between the axes. Because these ribs do not engage each other, it is avoided that the lungs are fully crushed. The ribs extending helically have the main function of moving forward the assembly, especially the hearts, along the axes.

Of course, the shape, dimension and position of the different ribs will depend upon the nature of the entrails, especially the hearts and lungs. Dependent upon the breed and age of the birds, from which the assemblies comprising heart and lungs originate, one can choose differently shaped ribs, whereas also the distance between the axes may be varied.

A special embodiment of the apparatus according to the invention is characterized in that the second part of the axes is followed by an additional part which again is provided with a more coarse profile. Generally, this additional third part is only needed when the separation between the lungs and the hearts has not been complete or when the hearts, after leaving the second part, are still suspended from parts of tissue which have to be removed. Using said third part, those parts of tissue, or any remains of lungs, still can be removed.

For separating the hearts and lungs in a controlled manner, it further is preferred that a discharge channel for the lungs is provided below the axes. This discharge channel, which generally extends along the entire length of the axes, collects lungs and material originating therefrom and discharges it towards a collecting location. At the end of the axes, the hearts are collected by means of another discharge channel and are removed towards a different location.

DETAILED DESCRIPTION OF THE PREFERRED EMBODIMENTS

Reference will now be made in detail to the presently preferred embodiments of the invention, one or more examples of which are illustrated in the sole FIGURE. Each example is provided by way of explanation of the invention, and not as a limitation of the invention. For example, features illustrated or described as part of one embodiment can be used on another embodiment to yield a still further embodiment. It is intended that the present invention cover such modifications and variations as come within the scope of the appended claims and their equivalents.

Hereinafter, the invention will be elucidated referring to the only FIGURE, in which schematically and in a top plan view an embodiment of the apparatus according to the invention has been illustrated.

There have been shown two axes 1 and 2 positioned alongside each other and extending horizontally and in parallel with each other. Each axis comprises a first part 3 having such a diameter that slit 4 is present between the axes. At the first part 3 of each axis 1, 2 a first surface profile is provided comprising ribs 7 extending in parallel with the center line 5, 6 of the axis 1, 2 and a second surface profile with ribs 8 extending helically.

The axes 1, 2 are driven in rotation in such a way that, as seen from above, the facing sides of the axes move downward. Thus, the helically extending ribs 8 will move an assembly comprising heart and lungs, which is positioned on top of the axes from the left to the right, as seen in the drawing.

The first part 3 of the axes is followed by a second part 9. This second part 9 is provided with a third surface profile section with a fine profile shaped as interengaging teeth. Thus, at said second part there is no slit between the axes.

Finally, in the illustrated embodiment, the second part 9 is followed by a third part 10. In correspondence with the first part 3, said third part 10 comprises straight ribs 11 and helically extending ribs 12.

Finally, the FIGURE shows that below the axes, extending along the entire length thereof, an only schematically indicated discharge channel 13 is positioned.

The apparatus operates as follows:

an assembly comprising heart and lungs (not illustrated) removed from a slaughtered bird is positioned on top of the rotating axes 1, 2 at the left hand side. Under influence of the engaging action of the ribs 7 (and possibly supported by the helically extending ribs 8) the lungs, which are of a softer nature than the heart, are put down through the slit 4. As a result of its more firm nature, the heart stays on top of the axes 1, 2. Thus, the lungs are torn loose from the heart. The lungs drop into the channel 13 and are removed. The heart is conveyed on top of the axes 1, 2 to the right by means of the helically extending ribs 8.

Next, the heart reaches the second part 9 of both axes, at which part the interengaging teeth grip tissues surrounding the heart and tear these loose from the heart. At said second part 9, the heart in a way is "milled free."

The helically extending teeth at said second part 9 further take care of conveying the heart to the right.

Finally, the heart reaches the third part 10 of the axes. At this third part, possible remains of lungs or other parts of tissue may be engaged by the ribs 11, and possibly the ribs 12, and be pulled down through the slit which is again provided between these axes. These parts of the assembly are also removed by means of the discharge channel 13. The hearts finally reach the extreme right end of the axes 1, 2 and drop into another discharge channel not represented, which conveys the hearts towards an appropriate location.

The invention is not limited to the embodiment described which can be varied widely within the scope of the invention as defined by the claims.

I claim:

1. An apparatus for separating the heart and lungs from an entrails package removed from a slaughtered bird, said apparatus comprising:

two adjacently disposed rotatable axes, said axes substantially parallel and defining a slit opening therebetween, said slit opening having a width so that lungs fall between said axes while hearts remain carried by said axes above said slit opening;

a first surface profile section defined at one end of each of said rotatable axes, said first surface profile sections adjacently disposed and defining said slit opening therebetween, said first surface profile sections comprising protruding longitudinally spaced pull down members configured to pull down the lungs from an entrails package laid on said rotatable axes as said axes rotate so that the lungs are pulled from the heart and fall through said slit opening;

a second surface profile section defined on each of said rotatable axes; each of said second surface profile sections comprising conveying members interspaced between said pull down members and configured to convey the heart and lungs along said axes towards an opposite end thereof as said axes rotate; and each of said axes further comprising a third surface profile section defined on said axes downstream from said first surface profile section in a conveying direction of said heart and lungs along said axes, each said third surface profile section comprising surface members configured and disposed to move the hearts along said axes after the lungs have fallen through said slit opening.

2. The apparatus as in claim 1, wherein said first surface profile section pull down members comprise longitudinally extending ribs defined on said axes and said conveying members of said second surface profile sections comprise helically extending ribs defined on said axes.

3. The apparatus as in claim 2, wherein oppositely facing said longitudinally extending ribs and helically extending ribs on each said axis do not interengage in said slit opening as said axes rotate.

4. The apparatus as in claim 1, wherein said third surface profile section members comprise teeth defined on said axes that interengage in said slit opening as said axes rotate.

5. The apparatus as in claim 4, wherein said interengaging teeth are angled to convey said hearts therealong as said axes rotate.

6. The apparatus as in claim 5, wherein said teeth are configured to clean said hearts as the hearts are conveyed along said second surface profile section.

7. The apparatus as in claim 1, further comprising a second set of first and second surface profile sections defined on said axes downstream from said third surface profile section in a conveying direction of said heart and lungs, to further remove any tissue from said hearts as said hearts are conveyed along said third surface profile section.

8. The apparatus as in claim 1, further comprising a discharge channel disposed below said slit opening for receiving said lungs.

* * * * *